US011803200B2

(12) United States Patent
Jager

(10) Patent No.: US 11,803,200 B2
(45) Date of Patent: Oct. 31, 2023

(54) THERMOSTATIC CARTRIDGE FOR A MIXING VALVE

(71) Applicant: VERNET, Ollainville (FR)

(72) Inventor: Frédéric Jager, Saint-Cheron (FR)

(73) Assignee: VERNET, Ollainville (FR)

( * ) Notice: Subject to any disclaimer, the term of this patent is extended or adjusted under 35 U.S.C. 154(b) by 255 days.

(21) Appl. No.: 17/299,675

(22) PCT Filed: Dec. 5, 2019

(86) PCT No.: PCT/EP2019/083800
§ 371 (c)(1),
(2) Date: Jun. 3, 2021

(87) PCT Pub. No.: WO2020/115199
PCT Pub. Date: Jun. 11, 2020

(65) Prior Publication Data
US 2022/0035388 A1 Feb. 3, 2022

(30) Foreign Application Priority Data
Dec. 6, 2018 (FR) ...................................... 1872451

(51) Int. Cl.
G05D 23/13 (2006.01)
(52) U.S. Cl.
CPC .................. G05D 23/1353 (2013.01)
(58) Field of Classification Search
CPC ....... F16K 17/38; F16K 31/002; G05D 23/13; G05D 23/1306; G05D 23/132;
(Continued)

(56) References Cited

U.S. PATENT DOCUMENTS 5,979,777 A * 11/1999 Ems .................... G05D 23/1346
236/100
6,085,984 A 7/2000 Chamot et al.
(Continued)

FOREIGN PATENT DOCUMENTS

CN 101809346 A 8/2010
EP 0936524 A1 8/1999
(Continued)

OTHER PUBLICATIONS

Search Report for French Application No. 1872451 dated Sep. 24, 2019.
(Continued)

Primary Examiner — Jonathan Bradford
(74) Attorney, Agent, or Firm — Pearne & Gordon LLP

(57) ABSTRACT

Thermostatic cartridge for a mixing valve for mixing a cold incoming fluid and a hot incoming fluid in a determined proportion to form a mixture. A head includes a housing extending along a central axis, and a thermostatic regulating assembly. A regulating system defines an abutment surface adjustable in axial translation with respect to the head. A thermostatic system includes a heat sensitive first portion over which the mixture can flow, and a second portion to abut axially against the abutment surface. The first portion can move the second portion axially between plural positions relative to the first portion, the relative positions determined by the mixing temperature. A slide mounted on the first portion moves axially relative to the head for modifying the determined proportion, and may slide between a normal position and plural overtravel positions axially closer to the head than the normal position.

11 Claims, 6 Drawing Sheets

Figure 1:
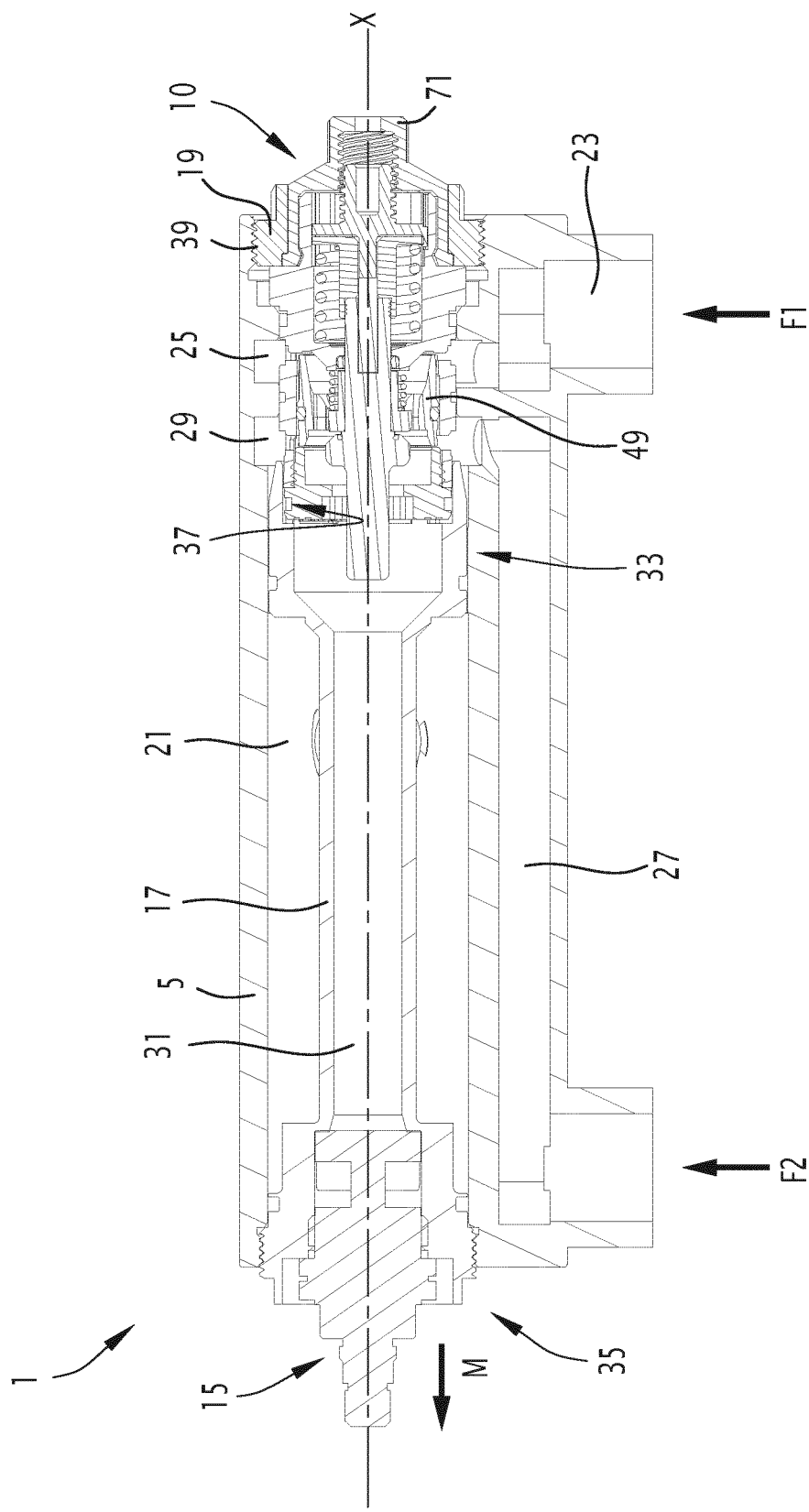

(58) Field of Classification Search
CPC ............. G05D 23/1326; G05D 23/134; G05D 23/1346; G05D 23/1353
See application file for complete search history.

(56) References Cited

U.S. PATENT DOCUMENTS

| | | |
|---|---|---|
| 7,673,808 B2 | 3/2010 | Mace et al. |
| 8,453,942 B2 | 6/2013 | Jager |
| 2010/0206955 A1 | 8/2010 | Jager |
| 2018/0321697 A1* | 11/2018 | Forrestal ............ G05D 23/1346 |
| 2019/0227583 A1 | 7/2019 | Jager et al. |

FOREIGN PATENT DOCUMENTS

| | | |
|---|---|---|
| EP | 2048564 A2 | 4/2009 |
| EP | 2202602 A1 | 6/2010 |
| FR | 2870611 A1 | 11/2005 |
| WO | 2004068252 A2 | 8/2004 |
| WO | 2010028790 A2 | 3/2010 |
| WO | 2018042050 A1 | 3/2018 |

OTHER PUBLICATIONS

Search Report for International Application No. PCT/EP2019/083800 dated Feb. 19, 2020.
English Translation of Search Report for Chinese Application No. 201980088007.4 dated Nov. 5, 2021.

* cited by examiner

THERMOSTATIC CARTRIDGE FOR A MIXING VALVE

This is the National Stage of PCT International Application No. PCT/EP2019/083800, filed on Dec. 5, 2019 which claims the priority of French Patent Application No. 1872451, filed on Dec. 6, 2018, both of which are incorporated herein by reference in their entirety.

The present invention relates to a thermostatic cartridge for a mixing valve, the mixing valve being intended for mixing a cold incoming fluid and a hot incoming fluid in a determined proportion to form a mixture having a mixing temperature, the cartridge comprising a head defining a housing extending along a central axis of the cartridge, and a thermostatic regulating assembly for regulating the mixing temperature, said thermostatic regulating assembly comprising:
- a regulating system at least partially received in the housing and defining an abutment surface adjustable in axial translation relative to the head;
- a thermostatic system comprising at least a first heat-sensitive portion over which the mixture is intended to flow, and a second portion adapted to abut axially against the abutment surface, the first portion being adapted to move the second portion in axial translation between a plurality of positions relative to the first portion, the relative positions being determined by the mixing temperature, and
- a slide mounted on the first part, the slide being movable in axial translation relative to the head between a plurality of slide positions, movement of the slide from one of these slide positions towards another being intended to change the said determined proportion.

It also relates to a mixing valve incorporating such a cartridge.

In the health field, the cartridge is a device for regulating hot and cold fluids to be mixed, in particular hot and cold water.

The temperature of the outgoing mixture is adjusted by the user by operating the regulating system to move the internal axial abutment surface relative to the cartridge head. The regulating system allows the user to regulate a set temperature.

The thermostatic system allows the mixing temperature to be regulated around this set temperature. In a conventional thermostatic system, the slide, whose axial position determines the proportion of cold and hot fluid in the mixture, is fixedly mounted on the first (heat-sensitive) part. The second part of the thermostatic system abuts axially against the abutment surface defined by the regulating system by means of a high-load, so-called "overtravel" spring.

The mixture flows over the first portion of the thermostatic system. If the mixing temperature rises slightly, because the temperature of the hot fluid rises for example, the first portion and the second portion move axially away from each other, causing the first portion to move away from the second portion. This causes the slide to move slightly away from the cartridge head, which increases the proportion of cold fluid in the mixture, and thus lowers the mixing temperature. Conversely, if the mixing temperature drops, because the temperature of the hot fluid drops for example, the slide moves slightly closer to the cartridge head, which increases the proportion of hot fluid and restores the desired mixing temperature.

A return spring, usually half the load of the overtravel spring, located axially on the other side of the slide from the cartridge head, ensures that the second portion constantly abuts the overtravel spring.

In the event of a significant increase in mixing temperature, for example due to an interruption in the flow of cold fluid, the relative axial distance between the first portion and the second portion becomes so great that the slide comes to abut against a shell of the cartridge defining the mixing chamber. Under these conditions, the thrust exerted by the second portion compresses the overtravel spring.

If the second portion were to abut directly, and not via the overtravel spring, against the abutment surface defined by the control system, the thermostatic system would be subjected to enormous compressive stresses due to expansion that could not be relieved. The thermostatic system would be irreparably damaged. Therefore, the overtravel spring effectively protects the thermostatic system in the event of a significant increase in the mixing temperature.

Such a cartridge is generally satisfactory, especially with regard to the thermostatic effect and the instantaneous protection of the thermostatic system that causes this effect. In normal operation, when the slide is not in abutment, the second portion of the thermostatic system undergoes a compression force equal to the thrust exerted by the return spring, that is, a force of approximately 60 N. However, when the slide comes to abut the casing due to a high mixing temperature, the second portion, relative to the first part, undergoes a compression force due solely to the compressed overtravel spring, which is then 120 N, increased by a fraction due to the contraction of this spring, that is, a total of approximately 150 N.

Such a force, in the long run, is likely to alter the thermostatic system and to impair the reliability of the cartridge.

An aim of the present invention is to provide a cartridge with improved long-term reliability.

To this end, it is an object of the invention to provide a cartridge of the type described above, wherein the slide is mounted with the ability to slide on the first portion of the thermostatic system between a normal position relative to the first portion, and a plurality of overtravel positions axially closer to the head than the normal position relative to the first portion, and
- the thermostatic system comprises a safety spring adapted to exert an axial force on the slide, the axial force being directed from the abutment surface toward the second portion.

According to particular embodiments, the cartridge comprises one or more of the following features, taken alone or in any technically possible combination:
- the first portion of the thermostatic system forms a flange, the slide axially abutting the flange in the normal position;
- the safety spring is axially compressed by the head and the slide;
- the head comprises a bottom surrounding the first portion of the thermostatic system along the central axis, the bottom and the first portion closing the housing axially on the side of the slide;
- the thermostatic system further comprises an end piece fixed to the first portion and movable in axial translation in the housing relative to the head; and a return spring exerting an axial return force on the end piece, the return force being directed from the second portion of the thermostatic system towards the abutment surface of the regulating system;

the end piece defines a central passage passing through, along the central axis, in which the regulating system and the second portion of the thermostatic system are at least partially engaged;

the regulating system comprises an abutment element forming the abutment surface, and mounted so as to slide axially relative to the head in the housing; and an regulating member mounted so as to rotate on the head, the regulating member being screwed axially onto the abutment element, a rotation of the regulating member relative to the head causing an axial translation of the abutment element; and the abutment element comprises a base defining a central passage through the central axis, and a regulating screw threaded into said central passage, the regulating screw having an axial end forming the abutment surface of the regulating system, and a screw head axially opposite the axial end; the regulating member defining a central hole adapted to allow axial access to the screw head.

The invention also relates to a mixing valve having a cartridge as described above.

According to one particular embodiment, the mixing valve comprises a valve body, the cartridge head and the valve body being screwed into each other, the valve body and the head together defining a mixing chamber adapted to receive the cold incoming fluid and the hot incoming fluid, the mixing valve for example comprising a locking ring screwed axially into or onto the valve body to lock the cartridge head and the valve body axially to each other.

Figure 2:
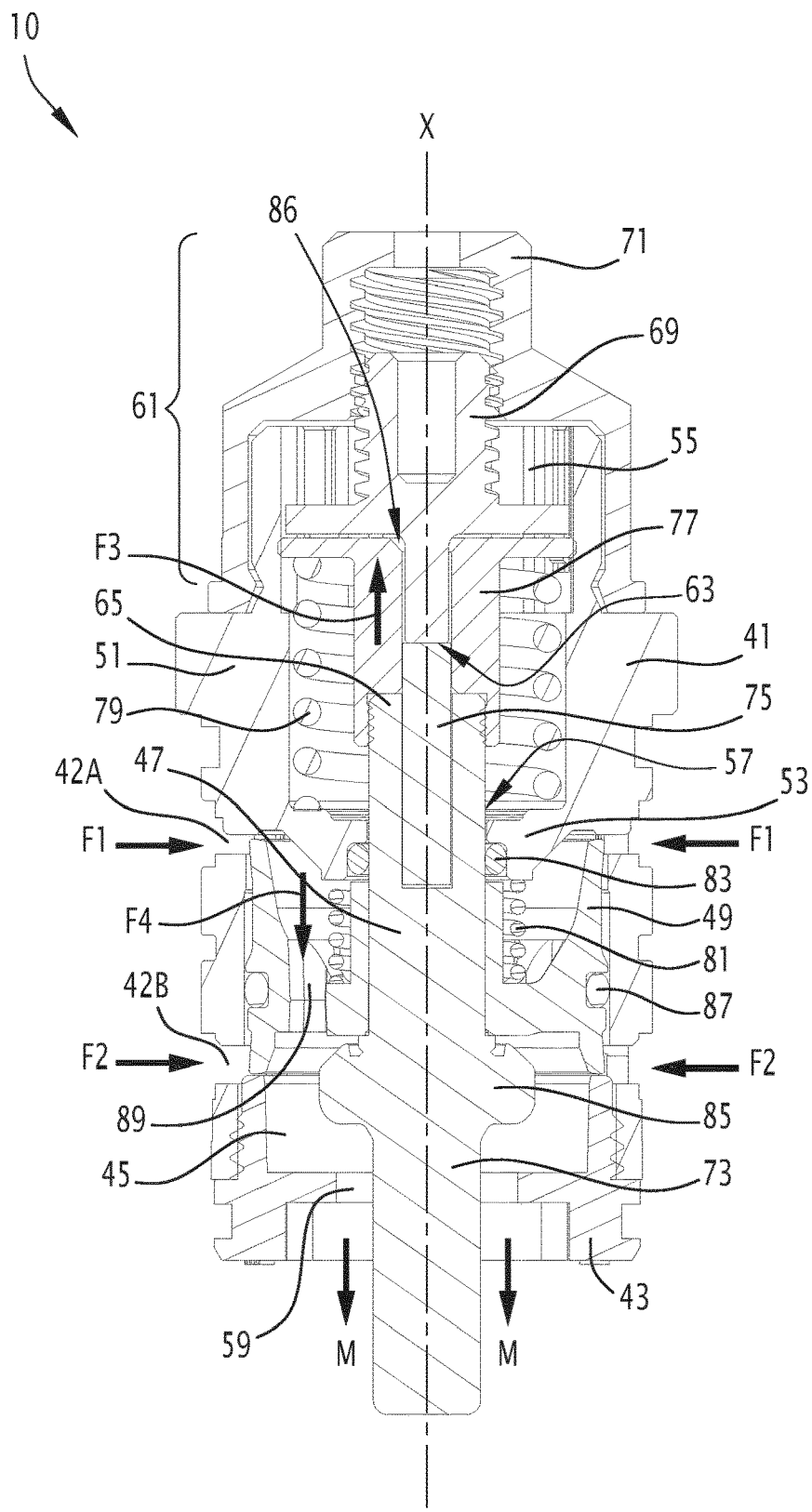
Figure 3:
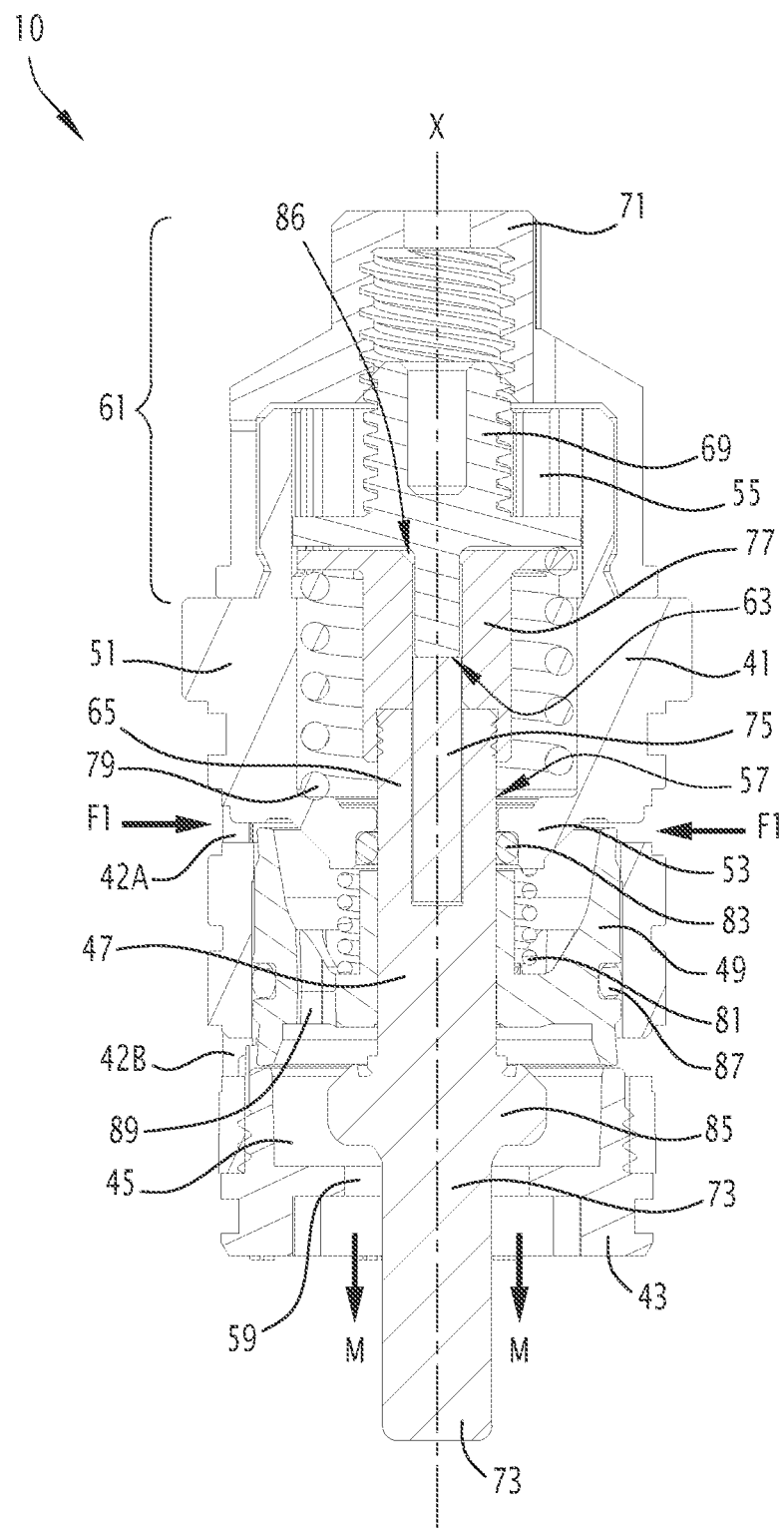
Figure 4:
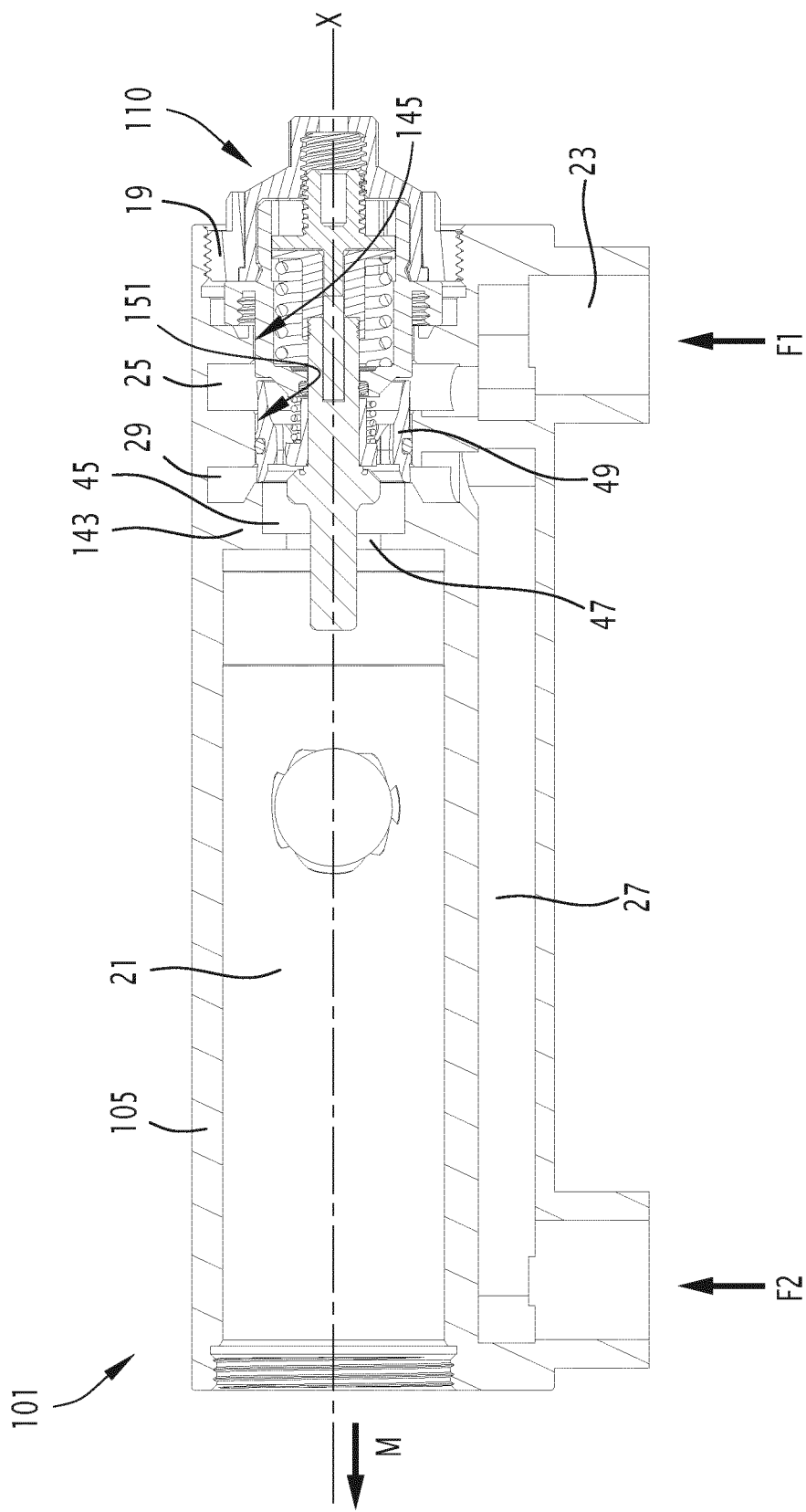
Figure 5:
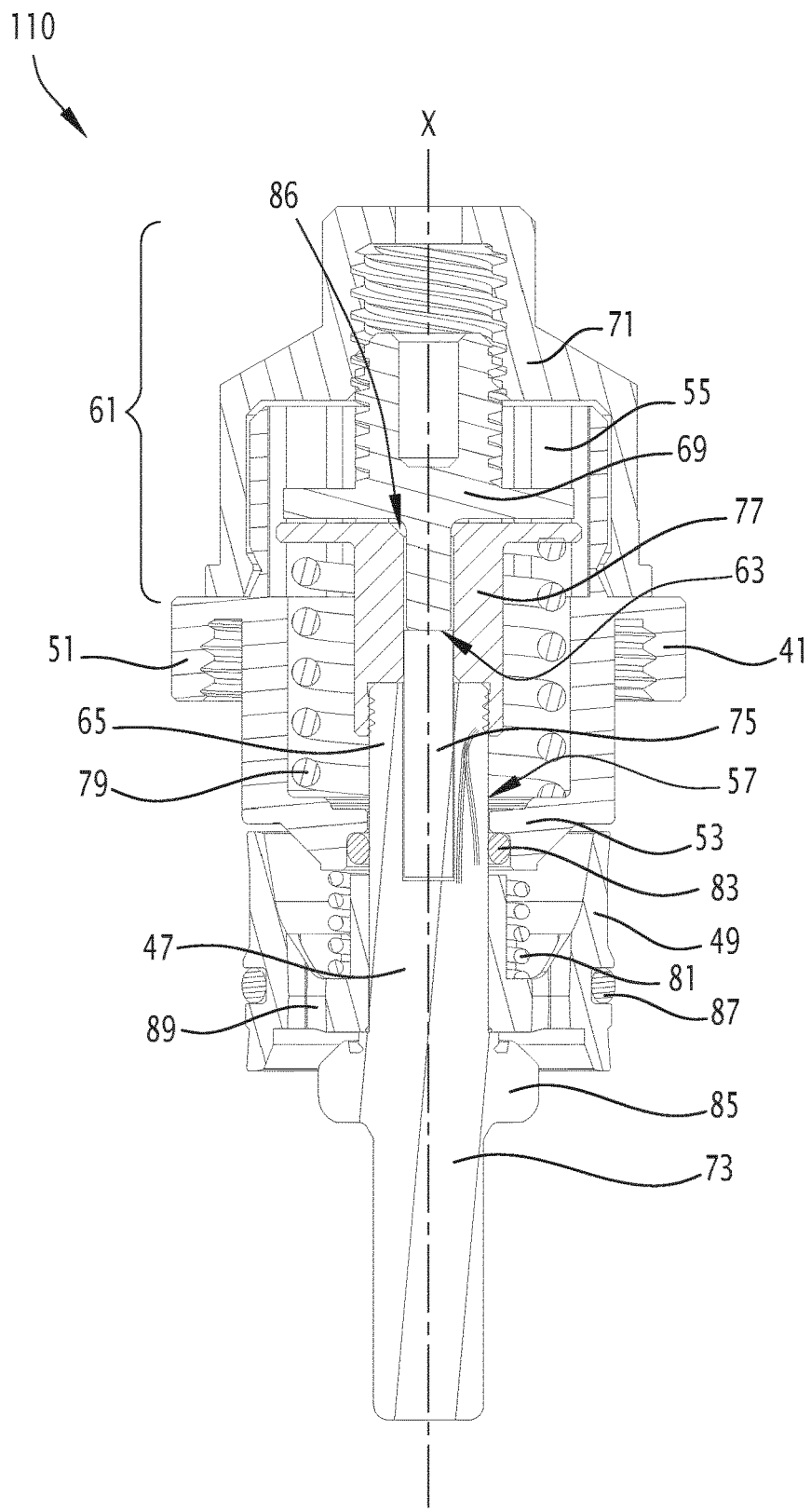
Figure 6:
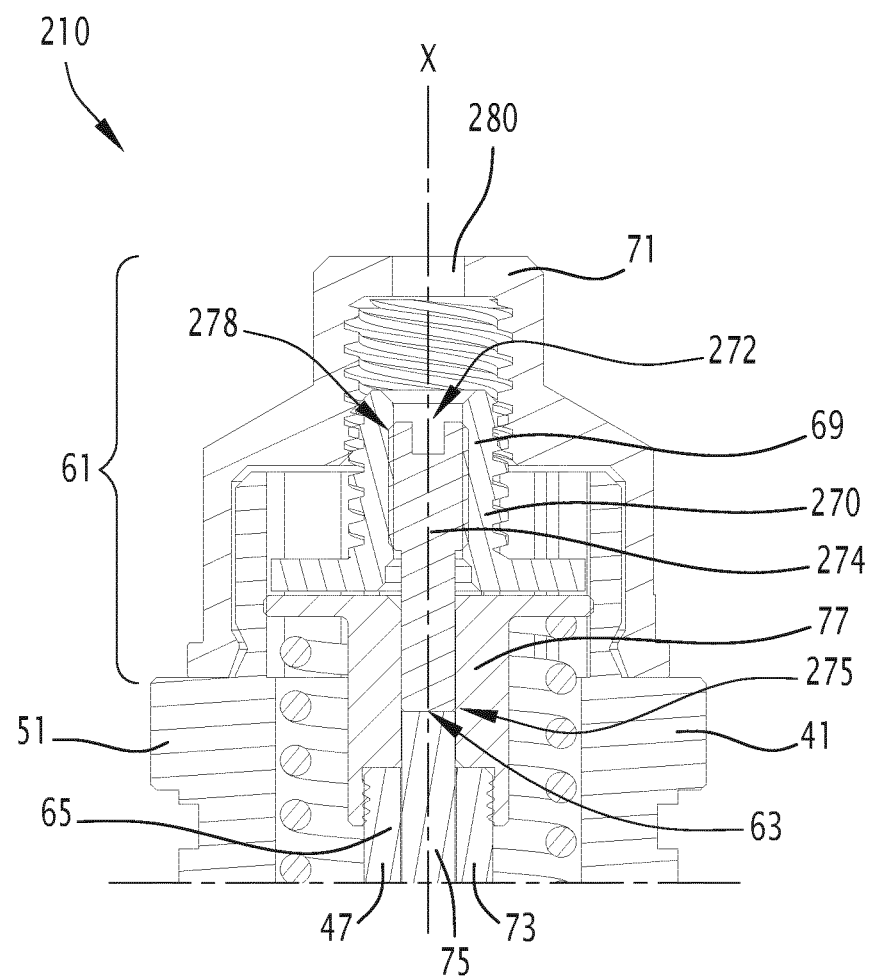

The invention will be better understood from the following description, given only by way of example and made with reference to the attached drawings, in which:

FIG. 1 is a schematic cross-sectional view, along a radial plane, of a mixing valve according to a first embodiment of the invention, comprising a thermostatic cartridge according to the invention, FIGS. 2 and 3 are schematic cross-sectional views, along the same radial plane, of the thermostatic cartridge shown in FIG. 1, the cartridge being in normal operation in FIG. 2, and in overtravel operation in FIG. 3, FIG. 4 is a schematic cross-sectional view, along a radial plane, of a mixing valve according to a second embodiment of the invention, comprising a thermostatic cartridge according to the invention, FIG. 5 is a schematic cross-sectional view of the cartridge shown in FIG. 4, and FIG. 6 is a partial schematic cross-sectional view of a variant of the cartridges shown in FIGS. 1 to 5.

A mixing valve 1 according to a first embodiment of the invention is described with reference to FIG. 1.

The mixing valve 1 is adapted to mix a cold incoming fluid F1 and a hot incoming fluid F2 in a predetermined proportion to form a mixture M having a mixing temperature and which exits the mixing valve for use by an operator (not shown). The mixing valve 1 is part of a sanitary installation (not shown), such as a shower cubicle or a bathtub, for example.

The fluid F1 comes from a water supply network (not shown) for example.

The fluid F2 comes from an individual or collective boiler (not shown), for example.

The mixing valve 1 comprises a valve body 5, a thermostatic cartridge 10 adapted to make the mixture M and defining a central axis X, a member 15 for regulating the flow rate of the mixture produced, possibly a sleeve 17 mechanically connecting the member 15 and the cartridge 10, and a ring 19 for locking the cartridge in the valve body.

In the illustrated example, the mixing valve 1 extends mainly along the central axis X.

The valve body 5 defines a main housing 21 in which the cartridge 10, the member 15 and the sleeve 17 are at least partially received. The valve body 5 defines a duct 23 for conducting the cold fluid F1 to an advantageously cylindrical distribution space 25, of the fluid F1 around the cartridge 10. The valve body 5 also defines a duct 27 for conducting the hot fluid F2 to a distribution space 29 analogous to the distribution space 25, but axially offset from the latter.

The main housing 21 advantageously has a generally cylindrical shape about the central axis X, and is continuous along this axis, for example.

The sleeve 17 extends axially into the main housing 21. The sleeve 17 is hollow and defines an internal axial passage 31 for conducting the mixture M from the cartridge 10 to the member 15. The sleeve 17 comprises a first axial end 33, rotationally fixed about the central axis X of a portion of the cartridge 10, and a second axial end 35 to which the member 15 is fixed, in the example shown.

The first axial end 33 defines axial notches 37, for example, into which a portion of the cartridge 10 engages axially, such that a torque force exerted on the second axial end 35 about the central axis X is transmitted to the first axial end 33 and the cartridge 10.

According to a variant not shown, the sleeve 17 is absent. In this case, the mixture M flows directly into the main housing 21. The member 15 is then mounted directly on the valve body 5.

The device 15 for regulating the flow rate of the mixture is known per se and will not be described here.

The ring 19 has an external thread 39, in the example shown. The ring 19 is screwed into the valve body 5.

The ring 19 is adapted to exert axial pressure on the cartridge 10 to hold it in the main housing 21.

As seen in FIGS. 2 and 3, the cartridge 10 has a symmetrical rotation about the central axis X.

The cartridge 10 comprises a head 41, a complementary member 43 adapted, with the head, to define a chamber 45, in which the mixture M is formed, and a thermostatic regulating assembly 47 having a slide 49, movable in axial translation relative to the head between a plurality of slide positions for regulating the mixing temperature.

Two are shown in FIGS. 2 and 3, respectively.

In the orientation of FIGS. 2 and 3, the head 41 defines an upper side along the central axis X, while the complementary member 43 defines a lower side.

Advantageously, the head 41 comprises a substantially cylindrical sidewall 51 about the central axis X, and a bottom 53.

The head 41 defines a housing 55 above the bottom 53, and, in the illustrated example, a portion of the mixing chamber 45 below the bottom.

The head 41 defines a first opening 42A for fluid F1, and a second opening 42B for fluid F2.

The bottom 53 extends radially. The bottom 53 defines an opening 57 through which the thermostatic regulating assembly 47 passes axially.

The housing 55 has a substantially cylindrical shape. The housing 55 is closed on the upper side by elements of the thermostatic regulating assembly 47 which will be described later.

The mixing chamber 45 is partially closed on the lower side by the complementary element 43, and on the upper side by the bottom 53.

In the first embodiment, the complementary element 43 forms a lower body of the cartridge 10.

The complementary element 43 is, for example, screwed into the head 41. The complementary element 43 defines a lower opening 59 allowing the flow of the mixture M to the outside of the cartridge 10, that is, downward in the orientation of FIGS. 2 and 3.

According to a variant not shown, the complementary element 43 has a greater axial extension than that shown in FIGS. 2 and 3, which may extend to the bottom 53 of the head 41 and even beyond. In this case, the inlets 42A and 42B are defined by the complementary element 43.

Advantageously, the openings 42A and 42B are circular about the central axis X and open into the distribution spaces 25 and 29. The openings 42A and 42B are axially offset and adapted to allow the entry of fluids F1 and F2, respectively, into the mixing chamber 45.

In addition to the slide 49, the thermostatic regulating assembly 47 comprises a regulating system 61 at least partially received in the housing 55 and forming an abutment surface 63 adjustable in axial translation relative to the head 41 between a plurality of regulating positions relative to the head. The thermostatic regulating assembly 47 also comprises a thermostatic system 65 extending axially through the opening 57.

The regulating system 61 comprises, for example, an abutment element 69 forming the abutment surface 63, and axially slidably mounted relative to the head 41 in the housing 55, and an regulating member 71 adapted to axially move the abutment element.

The regulating member 71 is for example mounted on the head 41 so as to rotate about the central axis X, and advantageously screwed axially onto the stop element 69. Advantageously, the regulating member 71 forms a button that can be actuated by an operator. A rotation of the regulating member 71 with respect to the head 41 causes an axial translation of the abutment element 69.

The thermostatic system 65 comprises a first heat-sensitive portion 73 over which the mixture M is intended to flow, and a second portion 75 axially abutting against the abutment surface 63 defined by the regulating system 61.

Advantageously, the thermostatic system 65 comprises an end piece 77 fixed on the first portion 73, for example by screwing, and movable in axial translation in the housing 55 with respect to the head 41. The thermostatic system 65 also comprises an axial return spring 79 on the end piece 77, the return force being directed from the second portion 75 towards the abutment surface 63.

The thermostatic system 65 axially abuts the abutment element 63, generally because the second portion 75 abuts the abutment surface 63, or because the end piece 77 abuts the abutment element 69.

The thermostatic system 65 comprises a safety spring 81 adapted to exert an axial force F4 on the slide 49, the axial force F4 being directed from the abutment surface 63 toward the second portion 75.

The first portion 73 is adapted to slide tightly in the bottom 53 by means of an O-ring 83. Advantageously, the first portion 73 forms a flange 85 against which the slide 49 abuts axially under the action of the safety spring 81 in normal operation.

The first portion 73 is adapted to move the second portion 75 in axial translation between a plurality of relative positions with respect to the first portion, the relative positions being determined by the mixing temperature.

In the illustrated example, the second portion 75 is partially engaged with the first portion 73 along the central axis X and moves out of the first portion the hotter the mixture M is.

Advantageously, a difference of 10° C. in the mixing temperature causes a relative displacement of the second portion 75 of several millimeters. The displacement is almost instantaneous.

The return spring 79 is, for example, axially compressed between the bottom 53 of the head 41 and the end piece 77. The return spring 79 has, for example, a load between two and four times that of the safety spring 81, preferably equal to about four times the latter.

The end piece 77 advantageously defines a central passage 86 passing through along the central axis X, in which the regulating system 61 and the second portion 75 of the thermostatic system 65 are at least partially engaged and guided.

The slide 49 is axially slidably mounted on the first portion 73 between a normal position relative to the first portion (shown in FIG. 2), in which the slide abuts axially downwardly against the flange 85, and a plurality of overtravel positions, in which the slide is axially closer to the head than in the normal position relative to the first portion (73). One of the overtravel positions of the slide 49 is shown in FIG. 3. In all of the overtravel positions, the slide 49 abuts axially downward, here on the complementary member 43.

The plurality of slide positions comprises two extreme positions. In one, shown in FIG. 3, the slide 49 abuts downward, here against the complementary member 43. In the other, which is inferred from FIGS. 2 and 3 by an upward translation of the slide 49, the slide 49 abuts upwardly against the head 41. The slide positions are configured so that moving the slide 49 from one of these positions to another position changes the determined proportion of cold fluid F1 and hot fluid F2 in the mixture M.

In a manner known per se, the slide 49 is adapted to slide axially in a sealed manner, by means of a seal 87, against a wall of the mixing chamber 45, the wall being formed here by the head 41.

According to a variant not shown, said wall is formed by the complementary element 43.

The slide 49 defines, for example, several axial passages 89 adapted to let the fluid F1 pass from the upper side of the slide to the lower side, where the fluid F1 mixes with the fluid F2.

The operation of the mixing valve 1 will now be described.

As seen in FIG. 1, the cold fluid F1 travels through the pipe 23 and arrives in the distribution space 25. The fluid F1 then enters the cartridge 10 (FIG. 2) through the inlet 42A. The fluid F1 first flows through the mixing chamber 45 above the slide 49, then through the passages 89 to arrive below the slide and mix with the hot fluid F2.

The hot fluid F2, before mixing with the cold fluid F1, passes through the pipe 27 (FIG. 1) to arrive in the distribution space 29. Then, the fluid F2 enters the cartridge 10 (FIG. 2) through the inlet 42B and arrives in the mixing chamber 45 where it mixes with the fluid F1 and forms the mixture M at the mixing temperature.

The mixture M flows against the first portion 73 of the thermostatic system 65, and exits the cartridge 10 through the opening 59.

The mixture M then flows into the conduit 31 of the sleeve 17 and exits the mixing valve at the member 15.

The device 15 allows the flow rate of the mixture M to be modified by admitting greater or lesser flow rates of fluid F1 and fluid F2.

The mixing temperature is determined by the slide position occupied by the slide 49. In the example shown in FIG. 2, the lower the slide 49 is, the lower the proportion of hot fluid F2 is.

To regulate a set temperature, the operator acts directly or indirectly on the regulating member 71, by rotating it in one direction or the other about the central axis X, which has the effect of axially moving the abutment surface 63.

Due to the return spring 79, in normal operation, the second portion 75 of the thermostatic system 65 remains in abutment with the abutment surface 63.

Similarly, in normal operation, by virtue of the safety spring 81, the slide 49 remains in axial abutment against the flange 85 of the first portion 73 of the thermostatic system 65. The slide 49, in normal operation, is fixed relative to the first portion 73. Thus, the operator moves the slide 49 axially by acting on the regulating system 61 to select the set temperature.

As the mixture M flows over the first temperature-sensitive portion 73 of the thermostatic system 65, the mixing temperature is communicated to this first part, which determines the relative position of the second portion 75 with respect to the first portion 73.

If the mixing temperature increases from the set temperature, the first portion 73 heats up and changes the relative position of the second portion 75 to the first portion, causing the slide 49 to move to a lower axial position relative to the head 41. This reduces the intake of the hot fluid F2 and helps to bring the mixing temperature back to the set value.

Conversely, if the mixing temperature decreases, the first portion 73 cools and changes the relative position of the second portion 75 to the first portion so that the slide 49 is moved upward relative to the head 41. This has the effect of reducing the proportion of cold fluid F1 to hot fluid F2 and helps to raise the mixing temperature towards the set temperature.

If the abutment surface 63 is set high enough relative to the head 41, the slide 49 may abut the head 41. In this case, contact between the second portion 75 and the abutment surface 63 may cease.

In normal operation, that is, when the slide 49 is in the normal position shown in FIG. 2, in axial abutment against the flange 85, the return force F3 is of the order of 80 N (newton). The axial force F4 exerted by the safety spring 81 on the slide 49 is of the order of 20 N. Thus, the second portion 75 of the thermostatic system undergoes, with respect to the first portion 73, an axial force of about 60 N (80 N−20 N).

If the mixing temperature M increases significantly, the expansion of the thermostatic system 65 is such that the slide 49 comes to a low stop, in the example against the complementary element 43. The slide 49 then leaves its normal position in abutment against the flange 65 to occupy one of the overtravel positions. This allows the thermostatic system 65 to expand freely without risk of damage.

In this overtravel operation, the second portion 75 undergoes, with respect to the first portion 73, a compression force which is due solely to the action of the return spring 79 on the end piece 77. This force is about 80 N, as in normal operation, plus about 15 N due to the additional compression of the return spring. The second portion 75 is thus subjected to a force of about 95 N, which is significantly lower than in the cartridges of the prior art.

As a result of the features described above, in particular the sliding mounting of the slide 49 on the thermostatic system 65, and the safety spring 81, the second portion 75 of the thermostatic system undergoes load cycles, and thus lower internal pressures, of about 30% less than in a conventional cartridge design. As a result, the thermostatic system 65 wears out less quickly and has an improved service life. As a result, the cartridge 10 offers greater reliability.

In addition, the thermostatic performance of the cartridge 10 is also improved.

In addition, as a result of the above features, the return spring, which is typically located below the flange 85 in the orientation of FIG. 2, is located in the housing 55, allowing for a more axially compact cartridge 10 design.

The thermostatic system 65 benefits from a long and precise guide between the bottom 53 of the head 41 on the one hand, and the end piece 77 on the other. In a conventional design of a thermostatic cartridge, the guidance of the thermostatic system is mostly realized around the second portion 75 and the slide 49. However, there is a large number of functional diametrical clearances around the second portion and around the slide, as well as geometric defects between components (concentricity, perpendicularity).

Finally, the end piece 77 allows, thanks to the central passage 86, a precise guidance between the abutment element 69 and the second portion 75 of the thermostatic system 65. Consequently, the risks of misalignment between the thermostatic system 65 and the head 41 are reduced. In contrast, in a conventional cartridge design, the alignment in question is dependent on a large number of functional diametrical clearances, as well as the aforementioned geometric defects between the components.

With reference to FIGS. 4 and 5, a mixing valve 101 according to a second embodiment of the invention will now be described.

The mixing valve 101 shown in FIG. 4 is analogous to the mixing valve 1 shown in FIG. 1. The similar elements have the same numerical references and will not be described again. Only the differences will be described in detail below.

The mixing valve 101 comprises a valve body 105 whose internal shapes differ from those of the valve body 5 shown in FIG. 1.

The mixing valve 101 does not include a sleeve 17, and its flow control member 15 (not shown) is structurally similar to that of the mixing valve 1, but directly attached to the valve body 105.

The mixing valve 101 comprises a simplified thermostatic cartridge 110 compared to the cartridge 10 shown in FIGS. 1 to 3.

Indeed, as can be seen in FIG. 5, the cartridge 110 does not comprise a complementary element defining, with the head 41, the mixing chamber. It is the valve body 105 that forms the complementary element to define the mixing chamber 45.

The sidewall 51 of the head 41 does not extend axially beyond the bottom 53. The head 41 does not radially define the mixing chamber 45. In particular, the slide 49 slides axially against an inner wall 151 of the valve body 105 located axially between the distribution spaces 25 and 29.

The valve body 105 comprises an internal projection 143 into the main housing 21. In this embodiment, the mixing chamber 45 is defined by the bottom 53 of the head 41, the slide 49, and the projection 143.

The projection defines a passage opening 147 for the mixture M.

In addition, the valve body 105 comprises an internal wall 145 in direct and sealed contact with the head 41.

The mixing valve 101 operates in a similar manner to the mixing valve 1.

The cartridge 110 has the additional advantage over the cartridge 10 of having fewer elements.

With reference to FIG. 6, a cartridge 210 is now described as an alternative to cartridges 10 and 110.

The cartridge 210 is similar to the cartridges 10 and 110 shown in FIGS. 2, 3 and 5. The similar elements have the same numerical references and are not described again. Only the differences will be described in detail below.

In cartridge 210, the abutment element 69 comprises a base 270 defining a central passage 272 extending through along the central axis X, and an regulating screw 274 threaded into the central passage.

The regulating screw 274 has an axial end 276 forming the abutment surface 63 of the regulating system 61, and a screw head 278 axially opposite the axial end 276.

The regulating member 71 defines a central opening 280 adapted to provide axial access to the screw head 278.

The operation of cartridge 210 is similar to the operation of cartridges 10 and 110.

The cartridge 210 provides additional regulating of the maximum temperature of the mixture M. In effect, the degree to which the regulating screw 274 is screwed into the base 270 determines the highest possible position for the abutment surface 63.

Since the sealing of the mixing chamber 45 axially towards the regulating system 61 is ensured by the tonic seal 83 arranged between the thermostatic system 65 and the bottom 53 of the head 51 (see FIG. 2), the upper portion of the cartridge 210 above the bottom 53 is out of water. Thus, additional sealing elements around the regulating screw 274 are not needed and are preferably omitted.

The invention claimed is:

1. A thermostatic cartridge for a mixing valve, the mixing valve being intended for mixing a cold incoming fluid and a hot incoming fluid in a determined proportion to form a mixture having a mixing temperature, the cartridge comprising a head defining a housing extending along a central axis of the cartridge, and a thermostatic regulating assembly for controlling the mixing temperature, said thermostatic regulating assembly comprising:
  a regulating system at least partially received in the housing and defining an abutment surface adjustable in axial translation relative to the head,
  a thermostatic system comprising at least a first heat-sensitive portion over which the mixture is intended to flow, and a second portion adapted to abut axially against the abutment surface, the first portion being adapted to move the second portion axially between a plurality of positions relative to the first portion, the relative positions being determined by the mixing temperature; and
  a slide mounted on the first portion, the slide being movable in axial translation relative to the head between a plurality of slide positions, movement of the slide from one of these slide positions towards another being intended to change said determined proportion,
wherein:
  the slide is mounted with the ability to slide on the first portion of the thermostatic system between a normal position relative to the first portion, and a plurality of overtravel positions axially closer to the head than the normal position relative to the first portion, and
  the thermostatic system comprises a safety spring adapted to exert an axial force on the slide, the axial force being directed from the abutment surface towards the second portion.

2. The cartridge according to claim 1, wherein the first portion of the thermostatic system forms a flange, the slide axially abutting the flange in the normal position.

3. The cartridge according to claim 1, wherein the safety spring is axially compressed by the head and the slide.

4. The cartridge according to claim 1, wherein the head comprises a bottom surrounding the first portion of the thermostatic system along the central axis, the bottom and the first portion closing the housing axially on the side of the slide.

5. The cartridge according to claim 1, wherein the thermostatic system further comprises:
  an end piece fixed on the first portion and movable in axial translation in the housing relative to the head, and
  a return spring exerting an axial return force on the end piece, the return force being directed from the second portion of the thermostatic system towards the abutment surface of the regulating system.

6. The cartridge according to claim 5, wherein the end piece defines a central passageway through which the regulating system and the second portion of the thermostatic system are at least partially engaged along the central axis.

7. The cartridge according to claim 1, wherein the regulating system comprises:
  an abutment element forming the abutment surface, and mounted to slide axially with respect to the head in the housing, and
  a regulating member rotatably mounted on the head, the regulating member being screwed axially on the abutment element, a rotation of the regulating member relative to the head causing an axial translation of the abutment element.

8. The cartridge according to claim 7, wherein the abutment element comprises:
  a base defining a central passage passing through, along the central axis, and
  a regulating screw threaded into said central passage, the regulating screw having an axial end forming the abutment surface of the regulating system, and a screw head axially opposite the axial end,
  the adjustment member defining a central opening adapted to provide axial access to the screw head.

9. A mixing valve comprising a cartridge according to claim 1.

10. The mixing valve according to claim 9, comprising a valve body, the head of the cartridge and the valve body being screwed into each other, the valve body and the head together defining a mixing chamber adapted to receive the cold incoming fluid and the hot incoming fluid.

11. The mixing valve according to claim 10, wherein the mixing valve comprises a locking ring screwed axially into or onto the valve body to lock the head of the cartridge and the valve body axially with respect to each other.

* * * * *